Jan. 14, 1969   T. ANDERSON ET AL   3,421,819
OPTICAL EXTENSOMETER
Filed July 17, 1964
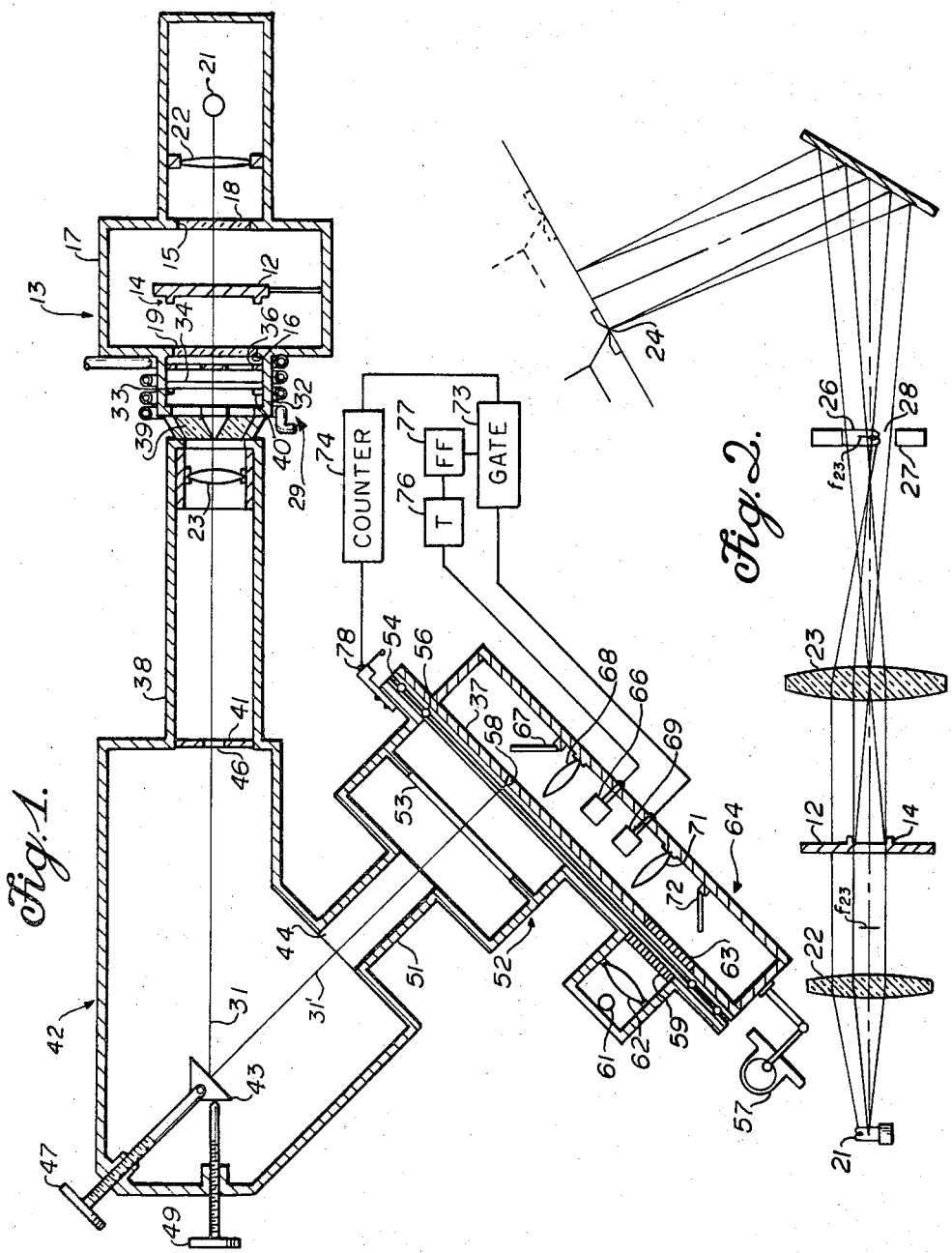
INVENTORS
THURE ANDERSON
ERNEST H. LORBEER
BY
ATTORNEY

United States Patent Office 3,421,819
Patented Jan. 14, 1969

3,421,819
OPTICAL EXTENSOMETER
Thure Anderson, Castro Valley, and Ernest H. Lorbeer, Livermore, Calif., assignors to the United States of America as represented by the United States Atomic Energy Commission
Filed July 17, 1964, Ser. No. 383,534
U.S. Cl. 356—32                    4 Claims
Int. Cl. G01b 11/16

ABSTRACT OF THE DISCLOSURE

An extensometer for monitoring dimensions of specimens disposed in an extreme environment, including an optical system for producing a real image of the test specimen with fiducial markers thereon in an external plane. The external image is scanned by means of a slit provided in a reciprocating carriage and moving in the image plane, and actuating a means coupled to said carriage to produce signal pulses proportional to the distance travelled by the carriage. Signals representative of the distance between the markers are summed in response to the triggering action of photosensitive means coupled to the carriage for sensing changes in light intensity between background light and the marker position of the image and passing through said slit.

---

The present invention relates to optical systems for measuring linear dimensions and more particularly to optical extensometers.

In recent years there has been an increased demand for materials having special high temperature properties and/or resistivity to hostile environments. This demand has spurred research and testing of old and new materials to ascertain their behavior under such extreme conditions. Of special importance are accurate determinations of elastic properties, tensile strength, creep, and other mechanical characteristics of materials necessary to reliably predict behavior and durability under such conditions.

It is often difficult, inconvenient, or impossible to meet the metrological instrumentation requirements of such tests with conventional equipment, because mechanical and electromechanical equipment is generally too sensitive for use in high temperature environments. The disposition of the vital metrological equipment outside the hostile test environment generally poses the problem of mechanically linking the measuring equipment with the test specimen. This introduces the inconvenience of taking into consideration the influence of the environment on the mechanical link itself, requiring an uncertain correction factor to be applied to each measurement. Also, the nature of some of the measurements undertaken, i.e., many individual measurements at discrete time intervals for relatively long periods, renders the use of optical equipment such as comparators and the like extremely laborious and time consuming while requiring the presence of an attendant.

The present device is an optical extensometer which accurately measures the lengths of objects by scanning an image of the object to be measured. The image is scanned by an optical grating integrally connected to the scanner which moves past a parallel mounted stationary grating of identical line width and spacing. The gratings move past one another so that a light beam from a light source located on one side of the two gratings and directed to pass therethrough is chopped into a number of light pulses.

As the scanner moves across the image, the transition from dark to light and vice versa at the boundaries of the object image actuates a counting or integrating circuit off and on, respectively. The integrating circuit sums the light pulses produced by the gratings, and, since the total number of light pulses is proportional to the distance traveled by the scanner, the sum of the light pulses affords a measure of the exact length of the image of the object.

The subject optical extensometer lends itself most readily to the high temperature testing of materials under extreme environmental conditions. This is accomplished by projecting the image of the object under test to the outside of the chamber and scanning the image as noted supra.

It is readily apparent that the extensometer of the prsent invention represents a significant improvement over those of the prior art with respect to the measurement of mechanical properties of test specimens under extreme environmental conditions. In particular, the extensometer of the present invention is located entirely outside the hostile test environment, obviating the use of special materials in their construction which are compatible with or unaffected by the test environment, the application of variable correction factors to the measurements, and the use of equipment connecting the test specimen with conventional metrological equipment disposed outside the test chamber. An additional advantage of the present invention is the fact that the measurement is obtained in the form of an electrical signal which is easily fed directly into and recorded by conventional readout, recording and display equipment.

Accordingly, it is a primary object of the present invention to provide a device for measuring linear distances which functions without being in contact with the object to be measured.

Another object of the present invention is to provide an instrument for measuring linear dimensions of test specimen while the test specimen is located in an extreme temperature environment.

A further object of the present invention is to provide an automatic extensometer readout system capable of performing continuous measurements for sustained time periods without the supervision of an operator.

Yet another object of the present invention is to provide a high accuracy optical measuring instrument whose output is in terms of digitized electrical signals which are not subject to inherent readout errors and which may be readily fed to conventional electronic recording instruments.

Other objects and advantages will become apparent to those skilled in the art upon consideration of the foregoing description in conjunction with the drawings, of which:

FIGURE 1 is an illustration of a preferred embodiment of the extensometer according to the present invention, FIGURE 2 is a schematic illustration of an optical arrangement for producing an object image at the scanner.

Basically, the present invention provides an optical extensometer for measuring the length of an object which comprises means for producing a sharp image of the object in a plane which is parallel or at a known angle to the dimension plane of the object being measured. The apparatus further includes means for illuminating reference markers and for establishing a discernable difference in the degree of brightness between the object image and the background, and scanning means for detecting and locating brightness changes in the image plane, comprising preferably a base having a narrow slit, which reciprocates in the plane of the image to scan the image in the general direction of the dimension to be measured. The scanning means is coupled to an arrangement for measuring the distance of travel of the slit, such as a first grating which chops a light beam directed through an identical second grating into a series of pulses. An electronic counting circuit responsive to the generated light pulses is triggered to count the light pulses by means for detecting brightness changes at the slit that scans the image. The distance to be measured is accurately represented by the sum total of the light pulses generated, which is in a known proportional relation to the object length. In addition, it should be noted that by adapting the scanning means to move the narrow slit in the orthogonally intersecting directions in the image plane, the effects of extreme environmental conditions on the entire object can be ascertained.

To discuss the invention in greater detail, reference is made to FIGS. 1 and 2. A test specimen 12 is suspended in a furnace 13 to ascertain the effects of high temperatures on its mechanical properties. Fiducial or preferably integral markers 14 are arranged on specimen 12 to provide reference points thereon whereby changes in its length can be measured. Diametrically opposed apertures 15 and 16 in the furnace walls 17 provide a light path through the furnace 13. The apertures 15 and 16 are closed with transparent windows 18 and 19 respectively, preferably of fused quarts for improved heat containment in furnace 13. In those cases where highly accurate measurements are to be made, the windows 18 and 19 should be optically flat for reasons to be set forth infra.

The general optical system for producing an image of test specimen 12 and particularly the fiduciary markers 14 is diagrammatically illustrated in FIG. 2. The optical system comprises a light source 21 and a condenser lens 22 which serves to illuminate an outline of a test specimen 12, including markers 14 which are shown diagrammatically. FIGURE 2 illustrates source 21 positioned at a distance from lens 22 equal to the lens focal length rendering the light from source 21 parallel. Other light collimator arrangements may also be used. An objective lens 23 is disposed in axial alignment with the light source 21, the condenser lens 22 and the test specimen 12. The focal length of the objective lens 23 is indicated as F23. The objective lens 23 focuses the light which outlines the specimen 12 to form an image of the specimen 12 in the scanning plane 24. Under extreme environmental temperature conditions where the specimen 12 acts as an intense source of radiation, it is preferable to locate the test specimen 12 between the condenser lens 22 and the objective lens 23 at a distance less than the focal length of the objective lens away from the objective lens 23; as illustrated in FIG. 2. The light source 21 is disposed near the focal point of the condenser lens 22 in such a relation to the objective lens 23, that an image of the light source 21 will be resolved between the objective lens 23 and the scanning plane 24. The image 26 of the light source 21 contains all the optical information necessary to produce an image of the test specimen 12 and markers 14. This concentration of the light including the test specimen image is of particular importance to the operativeness of the present extensometer when employed under such high temperature environment conditions. To reduce the effects of the thermal radiation emanating from furnace 13 and specifically specimen 12, a field stop 27 is positioned with its aperture 28 aligned in the plane of the light source image 26. The aperture size of field stop 27 is selected to restrict the passage of light to the minimum required for the formation of a sharp image of the test specimen 12. In this manner the intensity of the background optical thermal radiation is reduced to a level where it is possible to effectively eliminate it my means of conventional optical filters, e.g., an interference filter.

The preferred embodiment of FIG. 1 includes the optical system outlined in FIG. 2 with various modifications and additional features to meet the requirements set by the high temperature environment of the furnace 13. The light source 21 and condenser lens 22 are located adjacent to the quartz window 18 of furnace 13 in accordance with the distances specified above. Due to the high temperatures generated in the furnace 13, it is advantageous to utilize a relatively strong light source, such as one or preferably two high pressure mercury arc lamps. In order to be able to test specimens under environmental temperature conditions of several thousand degrees a heat baffle 29 is disposed in the optical path 31 adjacent to the quartz window 19 of furnace 13. The heat baffle 29 comprises a water cooled housing 32 mounted to the furnace portion surrounding aperture 16. The end of housing 32 distal aperture 16 along the optical path 31 is pervious to light. Housing 32 includes a mount 33 for securing within housing 32 an interference filter 34 perpendicular to optical path 31. Filter 34 serves to selectively attenuate the undesirable background heat radiation emanating from furnace 13 and the radiating specimen 12. The heat baffle 29 may include an annular apertured field stop means 36 to restrict the transmitted light to that definitive of an image of the specimen markers 14.

The objective lens 23 is disposed in axial alignment with light source 21 and condenser lens 22 along optical path 31 to receive the image of specimen 12 and focus it on the scanning table 37. The objective lens 23 is held in place by a tubular lens mount 38, one end of which is joined to the portion of housing 32 which surrounds aperture 19. The objective lens 23 is required to be capable of a resolution and enlargement congruent with the desired precision of the measurement. An ideal lens for performing measurements accurate to .0001″ has a resolution capability of at least 200 lines per mm. and a focal length of about 120 mm. An enlargement factor of about 1:5 from specimen to the measuring image has been found satisfatcory. It is advantageous to use a lens corrected for the principal wavelength of the light generated by source 21.

To insure high definition of the image of specimen 12, prisms 39 may be interposed between heat baffle 29 and objective lens 23 to guide the light from source 21 through central highest quality part of the lens 23. To further reduce unwanted radiation emanating from furnace 13 and more importantly specimen 12, additional apertured field stops 41 are axially interposed between objective lens 23 and scanner 37 at the image point of light source 21.

A housing 42 encloses a mirror 43 which is pivotably mounted along optical path 31 to receive and reflect the light directed by objective lens 23 toward the scanning plane of scanner 37. Housing 42 is provided with apertures 44 and 46 which are disposed therein to have their normal axes at an acute angle to one another with aperture 46 axially aligned with objective lens 23. Mirror 43 is axially movable in the general direction of the bisector of the angle defined by the apertures 44 and 46 and is adjusted by means of a set screw 47. Further, mirror 43 is pivotable about an axis perpendicular to both normal axes of the apertures 44 and 46 and is adjusted by a set screw 49. The folding mirror provision has the advantage of reducing the overall length and size of the instrument as well as permitting adjusting the position and focus of the image on scanner 37 by simply altering the position of mirror 43.

The remaining end of tubular lens mount 38 is jointed to the portion of housing 42 which surrounds and defines aperture 46. A second tubular member 51, axially aligned with the reflected optical path 45′, joins an optical path terminal housing 52 with housing 42. The numeral 53 refers to an exit window disposed in housing 52 axially aligned with reflected optical path 31′. This provides complete enclosure of the optical system thus keeping the system free from dust. However, it is entirely possible to eliminate the housings 42 and 52 as well as tubular members 38 and 51 without adversely affecting the operation of the instrument, especially where the instrument is used in a clean atmospheric environment. Additionally by constructing the housings and tubular members from light impervious materials, and slidably seating scanner 37 in light tight relation to windowed end of housing 52, a light tight enclosure is provided for the optical system.

Scanning table 37 shuttles on tracks 54 which are mounting in fixed relation to housing 52 parallel to the plane of the specimen image. Scanning table 37 and tracks 54 are preferably longitudinally mill slotted on their facing sides to receive bearings 56. The scanning table 37 is reciprocally driven by the motor 57. It is to be understood that the drive does not have to take place at constant speed and could for that matter be actuated by hand. One portion of the scanning table 37 is perforated by a narrow slit 58 exactly parallel to the reference edges of the marker images. As the scanning table 37 reciprocates, slit 58 moves across the image of the test specimen and markers thereon and the slit 58 traverses the edge of the marker image so that the intensity of the light falling through the slit 58 changes abruptly, thereby furnishing a signal source which locates the end points of the desired dimension.

Integrally mounted on scanning table 37 is a grating 59. The line rulings of the grating are preferably perpendicular to the direction of motion of the scanning table 37. A second light source 61 together with a condensing lens 62 provide a source of parallel light normal to grating 59. An elongated grating 63 identical to grating 59 with respect to line ruling density and line width is mounted in fixed relation to housing 42. The rulings of both gratings should be parallel to one another and the distance between the gratings should be small, i.e., on the order of mils. When the scanning table 37 is set in motion, grating 59 is moved past grating 63 and coacts therewith to chop the light beam emanating from the light source 61 into light pulses by virtue of the alternating juxtaposition of the slits of grating 59 to the slits and lines of grating 63.

The optical and electrical readout equipment for evaluating the light intensity and pulse signals issuing from the slit 58 and the gratings 59 and 63 respectively are mounted onto undercarriage 64 of the scanning table 37.

The portion of the equipment responsive to the intensity changes at the slit comprises a first photomultiplier tube 66 mounted in light tight relation to scanning table 37 to receive the light transmitted through slit 58. In the present preferred embodiment the light beam is bent by a plane mirror 67 through the condensing lens 68 to impinge upon the photomultiplier tube 66. Similarly, a second photomultiplier tube 69 is mounted together with a second condenser lens 71 and plane mirror 72 in receiving relation to the light pulses generated by the gratings 59 and 63.

The photomultiplier tube 69, energized by a suitable power supply (not shown), is connected to feed the electrical pulses generated thereby through an electronic gate 73 to a digital counter 74. The output signal generated by photomultiplier tube 66 is either a strong or weak signal depending on whether slit 58 is traversing the relatively dark specimen or specimen marker image region or the illuminated region adjacent to this image respectively. The output signal generated by tube 66 is utilized to initiate gate 73 to either allow or prevent the passage of the pulses generated by tube 69. Specifically, when slit 58 traverses the relatively dark specimen region, the signal generated by tube 66 is directed to a Schmidt trigger 76 which responds thereto by gating a flip flop circuit 77 to initiate gate 73 to allow the passage of pulses generated by tube 69. As slit 58 passes into an illuminated region, the signal generated by tube 66 is directed via Schmidt trigger 76 and flip flop 77 to initiate gate 73 to prevent passage of pulses generated by tube 69. Hence, it is seen that the total number of pulses passed by gate 73 is directly proportional to the length of the image traversed by slit 58.

The pulses passed by gate 73 are directed to counter 74 wherein they are accumulated and counted. Counter 74 is reset to zero by a microswitch 78 actuated by the scanning table 37 at the end of each scan of the specimen.

To operate the extensometer, a specimen of known length is disposed in the furnace 13. The light source 21 is turned on and the image of the specimen 12 is focused on the scanning table 37. The scanner 37 is set in reciprocating motion to generate a number of pulse sequences representative of the length of a known specimen 12 in order to calibrate the extensometer. An unknown specimen 12 is substituted for the known specimen and measured in like manner. The length can then be determined by comparing the pulse count of known and unknown specimens. It will be realized that the calibration of the instrument need not be repeated unless the distances of the optical components from one another is changed.

EXAMPLE

An extensometer according to the present invention and which is illustrated in FIGURE 1 has been built comprising an electric furnace 13 through whose walls 17 jaw portions of tensile loading machinery hermetically penetrate. The internal dimensions of the furnace are 7½ x 6 x 6 inches. The windows 18 and 19 are of fused quartz. An interference filter centered to transmit in the blue part of the spectrum corresponding to the principal emission of the Hg light source at 4358 A. is disposed in the water cooled heat baffle 29. All windows, mirrors and the interference filter are optically flat to less than 2 fringes of He light. The main objective 23 is an $f1.5$ Kodak Fluoro Ektar lens system, having a focal length of 111 mm. The scanning table 37 was constructed to include gratings 59 and 63 along side slit 58 within housing 52 thereby enabling utilization of light source 21, two high pressure Hg arc lights, for both the formation of the image of the test specimen 12, and for the generation of the light pulses by gratings 59 and 63. Both gratings 59 and 63 have 1000 lines/inch and a line width equal to the line spacing. The specimen is provided with markers approximately 1 inch from one another. The distance between the main objective and the specimen is about 3⅝" and the optical distance between the objective and the plane of scanning is about 27".

The instrument has been found capable of performing measurements accurate to within $10^{-4}$ inches up to an environmental temperature of 3500° F.

Whereas the above description was mainly directed to a preferred embodiment of the present invention, it will be realized by those skilled in the art that numerous further embodiments of the present device may be built without departing from the spirit and scope of the invention. The present invention is therefore to be limited only by the following claims.

What is claimed is:

1. In a device for measuring linear dimensions of a tensile test specimen bearing fixed fiducial markers thereon and disposed in an extreme high temperature environment, the combination comprising:
    (a) a chamber adapted to be heated to high temperatures including a first and second light pervious window disposed in opposite sides of said chamber to provide a light path through said chamber and including means for applying tensile stress to said test specimen within said chamber in said light path;
    (b) a light source disposed outside said chamber on the first window side in axial alignment with said windows, stationary with respect to said test specimen, to illuminate the outline of said test specimen and said fixed markers thereon;

(c) a condensing lens interposed between said light source and said first window in axial alignment therewith;

(d) an objective lens disposed outside said chamber on the second window side with said light source and said test specimen, at a distance longer than the focal length of said objective lens away from said test specimen to bring into focus a real image of said test specimen and markers thereon in a selected plane outside said chamber;

(e) a field stop means disposed in axial alignment with said objective lens and said light source in the plane of focus of said light source;

(f) scanning means having a surface substantially impervious to the radiation definitive of said image disposed at said selected plane in planar alignment with said image, said surface defining a slit-like aperture and said scanning means adapted to move reciprocally in the plane of said image in the general direction of said linear dimension to be measured with said slit-like aperture successively traversing the image of said markers;

(g) signal generating means responsive to the motion of said scanning means to produce a first signal proportional to the distance traveled by said scanning means;

(h) integrating means for summing said first signals issuing from said signal generating means; and (i) photomultiplier trigger means disposed adjacent said slit-like aperture to sense an intensity change of the radiation incident on said slit-like aperture, and furnish a second electrical signal in response thereto, electrically connected to said integrating means, said integrating means summing said first signals between successive transversals of said image of said markers by said slit-like aperture in response to said second signals received from said trigger means.

2. The device of claim 1 further defined by
(a) a cooled heat baffle impervious to thermal radiation interposed between said second window of said chamber and said objective lens, said baffle defining apertures in the region traversed by the light defining the image of said object.

3. The device of claim 1 further defined by
(a) a plane mirror disposed transversely to the optical path of said objective lens on the side of said objective lens distal said object with the reflecting side of said mirror in facing relation to said objective lens, said mirror mounted movably in the direction of the optical path and rotatably about an axis transverse to the optical path, the radiation definitive of said image directed by said mirror being projected on said surface of said scanning means.

4. In a device for measuring linear dimensions of light emitting object exposed to extreme temperature environment conditions, the combination comprising,
(a) a furnace including a first and second optically flat quartz windows disposed in the furnace walls on opposite sides of said furnace to provide a light path therethrough, said furnace having test facility means for disposing said object within said furnace in said light path, (b) at least one mercury arc lamp light source disposed outside said furnace on the first window side in axial alignment with said windows, said object obstructing passage of light from said source through said second window, (c) a condensing lens interposed between said lamp and said first window in axial alignment therewith, (d) a housing having hollowed walls through which a cooling medium is directed defining first and second apertures in opposite sides of said housing, said housing mounted on the second window side of said furnace to have its apertures in axial alignment with said object and lamp, (e) a first interference filter for passing the light characteristic of said lamp mounted within said housing in axial alignment with said apertures of said housing, (f) prism means mounted outside the second aperture side of said housing to receive the light beam transmitted therethrough and parallelly constrict the beam, (g) an objective lens having a focal length in the range of 100 to 200 millimeters disposed in axial alignment with and at a distance less than its focal length from said object, said objective lens receiving said light beam substantially in its central region, said objective lens forming an image of said lamp and in age of said object, said lamp image formed between said object image and said objective lens, (h) a field stop means disposed in axial alignment with said objective lens and lamp at the image point of said lamp, (i) a second interference filter pervious to light characteristic of said lamp disposed in axial alignment with the optical path adjacent to said field stop on the side distal said objective lens, (j) a plane mirror disposed transversely to the optical path of said objective lens to receive the light transmitted through said second filter with reflecting side of said mirror in facing relation to said second filter, said mirror mounted movably in the direction of the optical path and rotatably about an axis transverse to the optical path, the light of said lamp definitive of said object projected to a selected plane, (k) a planar scanning table defining a slit-like aperture at said selected plane in planar alignment with said projected image, (l) support means including smooth tracks for mounting said scanning table in a sliding relation thereto in the plane of said image, (m) driving means mechanically linked with said scanning table to reciprocally slide said scanning table in the plane of said image, (n) a first ruled grating having a selected number of rulings per unit length of a width comparable to the spacing between said rulings, said grating mechanically linked to said table in proportional reciprocal relation thereto, (o) a second ruled grating immovably mounted in corresponding oriented parallel spaced relation to said first grating at distance therefrom of less than 2 millimeters, said second grating having the same number of rulings per unit length as said first grating and of a length transverse to said rulings at least coextensive with the maximum displacement of said first grating, (p) means for directing a beam of light through said parallel oriented gratings whereby said beam of light converted to a sequence of light pulses by the reciprocating action of said first grating, (q) a first photomultiplier disposed to receive the generated light pulses and convert them to electrical pulses, (r) an electronic gate connected to receive said output of said first photomultiplier, (s) a second photomultiplier disposed to receive light passed by said slit-like aperture and generate a gating pulse when said slit is positioned adjacent to the image of said object, the output of said second photomultiplier connected to said electron gate, said gate responsive to said gating pulse to allow passage of said electrical pulses therethrough, and (t) an electronic counter disposed to receive and count said electrical pulses from said gate.

(References on following page)

References Cited

UNITED STATES PATENTS

| | | | |
|---|---|---|---|
| 1,729,239 | 9/1929 | Anderson | 240—47 X |
| 1,963,128 | 6/1934 | Geister. | |
| 2,562,525 | 7/1951 | Cary | 250—235 X |
| 2,674,916 | 4/1954 | Smith. | |
| 2,928,952 | 3/1960 | Bednarz. | |
| 3,218,389 | 11/1965 | Reed. | |
| 3,218,911 | 11/1965 | Bower et al. | |
| 3,309,958 | 3/1967 | Simon. | |
| 3,312,140 | 4/1967 | Dokoupil. | |

JEWELL H. PEDERSEN, *Primary Examiner.*

A. A. KASHINSKI, *Assistant Examiner.*

U.S. Cl. X.R.

73—95; 250—219, 235; 350—167; 356—36